US010713036B2

(12) United States Patent
Chen et al.

(10) Patent No.: US 10,713,036 B2
(45) Date of Patent: Jul. 14, 2020

(54) METHOD, DEVICE AND COMPUTER PROGRAM PRODUCT FOR DATA PROTECTION

(71) Applicant: EMC IP Holding Company LLC, Hopkinton, MA (US)

(72) Inventors: Ling Chen, Chengdu (CN); Xiaoliang Zhu, Shanghai (CN); Jie Li, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/251,377

(22) Filed: Jan. 18, 2019

(65) Prior Publication Data
US 2019/0220267 A1   Jul. 18, 2019

(30) Foreign Application Priority Data

Jan. 18, 2018   (CN) .......................... 2018 1 0050700

(51) Int. Cl.
*G06F 9/44* (2018.01)
*H04L 9/32* (2006.01)
(Continued)

(52) U.S. Cl.
CPC .................. *G06F 8/65* (2013.01); *G06F 8/61* (2013.01); *G06F 11/1433* (2013.01);
(Continued)

(58) Field of Classification Search
CPC . G06F 8/64; G06F 8/61; G06F 9/4411; G06F 21/6254; G06F 21/6218;
(Continued)

(56) References Cited

U.S. PATENT DOCUMENTS 7,069,440 B2 *   6/2006   Aull ........................ G06F 21/33
                                                      707/999.201
8,799,053 B1 *   8/2014   Goldberg ............ G06F 21/6254
                                                       705/7.29

(Continued)

OTHER PUBLICATIONS

Martin Georgiev et al., The Most Dangerous Code in the World: Validating SSL Certificates in Non-Browser Software, Oct. 16-18, 2012, [Retrieved on May 21, 2020]. Retrieved from the internet: <URL: https://dl.acm.org/doi/abs/10.1145/2382196.2382204> 8 Pages (38-49) (Year: 2012).*

(Continued)

*Primary Examiner* — Anibal Rivera
(74) *Attorney, Agent, or Firm* — Chamberlain, Hrdlicka, White, Williams & Aughtry (57) ABSTRACT

Embodiments of the present disclosure provide a method, a device and a computer program product for data protection. According to embodiments of the present disclosure, a client receives, from a server, a certificate for verifying data validity. In response to receiving, from the server, an installation package to be verified for data validity, the client determines whether the installation package is valid using the certificate. The installation package is associated with one update application of the operating system of the client. In response to determining that the installation package is valid, the installation package is installed at the client.

12 Claims, 4 Drawing Sheets

(51) Int. Cl.

| | |
|---|---|
| *G06F 21/60* | (2013.01) |
| *G06F 8/65* | (2018.01) |
| *H04L 29/08* | (2006.01) |
| *G06F 21/64* | (2013.01) |
| *H04L 29/06* | (2006.01) |
| *G06F 8/61* | (2018.01) |
| *G06F 11/14* | (2006.01) |
| *G06F 21/10* | (2013.01) |
| *G06F 9/455* | (2018.01) |

(52) U.S. Cl.
CPC .............. *G06F 21/10* (2013.01); *G06F 21/64* (2013.01); *H04L 9/3268* (2013.01); *H04L 63/12* (2013.01); *H04L 63/123* (2013.01); *H04L 67/34* (2013.01); *G06F 9/45533* (2013.01); *H04L 67/26* (2013.01)

(58) Field of Classification Search
CPC ........ G06F 11/1433; G06F 8/65; G06F 21/10; G06F 21/64; H04L 9/3268; H04L 9/14; H04L 9/3247; H04L 9/0825; H04L 63/12; H04L 63/123; H04L 67/34
See application file for complete search history.

(56) References Cited

U.S. PATENT DOCUMENTS

| | | | | |
|---|---|---|---|---|
| 9,280,337 | B2* | 3/2016 | Palaniappan | G06F 8/65 |
| 9,749,315 | B1* | 8/2017 | Kristensen | H04L 63/0823 |
| 10,361,852 | B2* | 7/2019 | Kazin | H04L 9/006 |
| 10,374,808 | B2* | 8/2019 | Frederick | H04L 63/126 |
| 10,411,894 | B1* | 9/2019 | Yavnilovich | H04W 12/00503 |
| 10,425,417 | B2* | 9/2019 | Frederick | H04L 63/0823 |
| 10,432,595 | B2* | 10/2019 | Frederick | H04L 63/045 |
| 2003/0237004 | A1* | 12/2003 | Okamura | H04L 63/0272 726/15 |
| 2005/0120106 | A1* | 6/2005 | Albertao | H04L 69/329 709/223 |
| 2006/0160626 | A1* | 7/2006 | Gatto | A63F 13/71 463/43 |
| 2006/0277413 | A1* | 12/2006 | Drews | G06F 21/6227 713/189 |
| 2007/0169079 | A1* | 7/2007 | Keller | G06F 8/65 717/168 |
| 2008/0072311 | A1* | 3/2008 | Mullick | H04L 67/1008 726/15 |
| 2008/0303630 | A1* | 12/2008 | Martinez | G07C 9/00182 340/5.7 |
| 2009/0327696 | A1* | 12/2009 | Hatlelid | H04L 9/3265 713/151 |
| 2010/0325419 | A1* | 12/2010 | Kanekar | H04L 63/0471 713/151 |
| 2010/0325420 | A1* | 12/2010 | Kanekar | H04L 9/3297 713/151 |
| 2011/0126003 | A1* | 5/2011 | Engert | H04L 63/0823 713/156 |
| 2012/0260082 | A1* | 10/2012 | Bobzin | G06F 21/572 713/100 |
| 2013/0290234 | A1* | 10/2013 | Harris | G06N 5/022 706/46 |
| 2014/0289873 | A1* | 9/2014 | Morss | H04L 63/0442 726/30 |
| 2015/0365426 | A1* | 12/2015 | Henocque | H04L 9/3236 713/176 |
| 2016/0087955 | A1* | 3/2016 | Mohamad Abdul | H04L 67/26 726/7 |
| 2016/0182464 | A1* | 6/2016 | Mintz | H04L 63/0442 713/170 |
| 2016/0330230 | A1* | 11/2016 | Reddy | G06F 9/45533 |
| 2016/0371472 | A1* | 12/2016 | Walsh | G06F 21/12 |
| 2017/0093586 | A1* | 3/2017 | Miranda | H04L 9/3268 |
| 2017/0126664 | A1* | 5/2017 | Khandelwal | H04L 63/0823 |
| 2017/0250826 | A1* | 8/2017 | Yang | H04L 9/0891 |
| 2018/0364927 | A1* | 12/2018 | Baptist | G06F 11/1076 |
| 2019/0163911 | A1* | 5/2019 | Kliewer | G06F 21/575 |

OTHER PUBLICATIONS

Boyuan He et al., Vetting SSL Usage in Applications with SSLint, 2015 IEEE, [Retrieved on May 21, 2020]. Retrieved from the internet: <URL: https://ieeexplore.ieee.org/stamp/stamp.jsp?arnumber=7163045> 16 Pages (519-534) (Year: 2015).*

* cited by examiner

(12) United States Patent

METHOD, DEVICE AND COMPUTER PROGRAM PRODUCT FOR DATA PROTECTION

FIELD

Embodiments of the present disclosure generally relate to the field of data protection, and more specifically, to a method, device and computer program product for data protection of an installation package for data update.

BACKGROUND

In a data protection system based on a client and server architecture, a server for data protection may perform data protection for a plurality of clients in order to verify whether the installation package for updating an application is valid. For example, the plurality of clients may install the application installation package so as to be capable of communicating securely with, for example, other central servers. In different operating systems, the installation package may take many different forms.

For a typical data protection system, the server generally pushes the installation package to a plurality of clients to avoid the plurality of clients having to install this installation package manually. Presently, the security of the data protection system becomes an increasingly important issue. Generally, for security reasons, the installation packages of different operating systems may need to be signed with a security certificate or security key. The installation package signed with the certificate or security key is then pushed by a data protection server to the client. To install the above-mentioned signed installation package successfully at the client, it may be necessary to import the security certificate or security key to the client before the application is formally installed, which may require a large amount of labor cost for a data protection system where thousands of clients exist.

SUMMARY

Embodiments of the present disclosure provide a method, device and computer program product for a data protection system.

In a first aspect of the present disclosure, there is provided a method for data protection, comprising: receiving, from a server, a first certificate for verifying data validity; in response to receiving, from the server, an installation package to be verified for data validity, determining whether the installation package is valid using the first certificate, the installation package being associated with one system update application of an operating system of the client; and in response to determining that the installation package is valid, installing the installation package at the client.

In a second aspect of the present disclosure, there is provided a device for data protection. The device comprises at least one processing unit and at least one memory coupled to the at least one processing unit and storing instructions executed by the at least one processing unit. The instructions, when executed by the at least one processing unit, cause the device to perform acts comprising: in response to receiving, from a server, an installation package to be verified for data validity, determining whether the installation package is valid using the first certificate, the installation package being associated with one system update application of an operating system of the client; and in response to determining that the installation package is valid, installing the installation package at the client.

In a third aspect of the present disclosure, there is provided a computer program product. This computer program product is tangibly stored on a non-transient computer storage medium and comprises machine executable instructions. The machine executable instructions, when executed by a device, cause the device to execute any step of the method described according to the first aspect of the present disclosure.

The Summary is provided to introduce a selection of concepts in a simplified form that are further described below in the Detailed Description. The Summary is not intended to identify key features or essential features of the present disclosure, nor is it to limit the scope of the present disclosure.

BRIEF DESCRIPTION OF THE DRAWINGS

Through the following detailed description of example embodiments of the present disclosure with reference to the accompanying drawings, the above and other objectives, features, and advantages of the present disclosure will become more apparent. In example embodiments of the present disclosure, the same reference signs usually refer to the same parts.

Throughout the drawings, the same or corresponding reference symbols refer to the same or corresponding parts.

DETAILED DESCRIPTION OF EMBODIMENTS

Preferred embodiments of the present disclosure will be described below in greater detail with reference to the accompanying drawings. Although preferred embodiments of the present disclosure are displayed in the accompanying drawings, it should be understood that the present disclosure can be implemented in various manners, without limiting to the embodiments set forth herein. On the contrary, these embodiments are provided to make the present disclosure more thorough and complete and are capable of conveying the scope of the present disclosure completely to those skilled in the art.

The term "includes" used herein and its variants refer to open-ended terms that mean "includes, but is not limited to." The term "or" refers to "and/or" unless otherwise indicated. The term "based on" refers to "based at least in part on." The term "an example embodiment" and "an embodiment" refer to "at least one example embodiment." The term "another embodiment" refers to "at least one another embodiment." Terms "first," "second" and the like can represent different or the same objects. The following may also include other explicit or implicit definitions.

Figure 1:
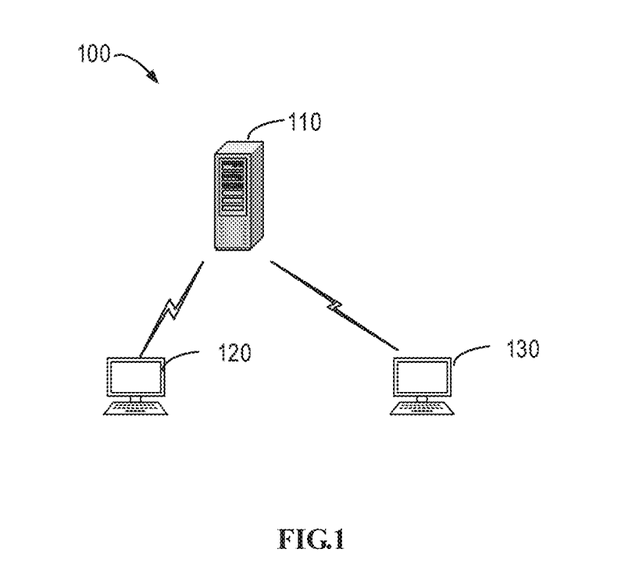
FIG. 1 shows a schematic diagram of a data protection system that may be used to implement embodiments according to the present disclosure.

FIG. 1 shows a schematic diagram of a data protection system 100 for realizing data security. As illustrated in FIG. 1, the data protection system 100 may include a server 110 for data protection as well as clients 120 and 130 to implement an application installation program. It is to be understood that the structure and function of the data protection system 100 shown in FIG. 1 are for illustration purpose only, rather than to suggest any limit to the scope of the present disclosure. Embodiments of the present disclosure may be embodied in different structures and/or functions. Besides, the number of servers and clients shown in FIG. 1 is only illustrative. Without losing generality, the data protection system 100 shown in FIG. 1 may include any number of servers and clients, that is, the present disclosure is not limited in this aspect.

As shown in FIG. 1, the server 110 communicates with clients 120 and 130 through one or more communication links in order to push an installation package associated with one system update application of the operating system of the client to clients 120 and 130. To ensure data security of this installation package, the server 110 needs to sign the installation package using a security certificate or security key, then the server 110 transmits the signed installation package to clients 120 and 130. To verify whether the installation package is valid, clients 120 and 130 need to determine the certificate or security key used to sign the installation package, and determine whether the received installation package is the valid installation package required by clients 120 and 130 based on the determined certificate or security key.

In a traditional data protection system, it is necessary to manually import, at the client, a certificate or security key for determining whether the installation package is valid. For a data protection system where a large number of clients exist, it might take a lot of time to manually import the above certificate or security key at the large number of clients to order to perform an application upgrade of an installation package. This will affect the efficiency of the data protection system performing application upgrade.

To solve one or more of the above and other potential problems, example embodiments of the present disclosure provide a method for data protection. In embodiments of the present disclosure, the server 110 pushes the certificate or security key for verifying data validity to clients 120 and 130 through a wired or wireless link. After receiving from the server the installation package for performing application update, clients 120 and 130 will verify whether the received installation package is valid using the received certificate or security key. In the case that it is determined that the received installation package is valid, clients 120 and 130 will install the received installation package to complete upgrade or update of the operating system of the client. Therefore, clients 120 and 130 will avoid importing or downloading the certificate or security key for verifying data validity at a large number of clients through embodiments of the present disclosure, which will improve the update or upgrade efficiency of the data protection system 100 significantly.

Figure 2:
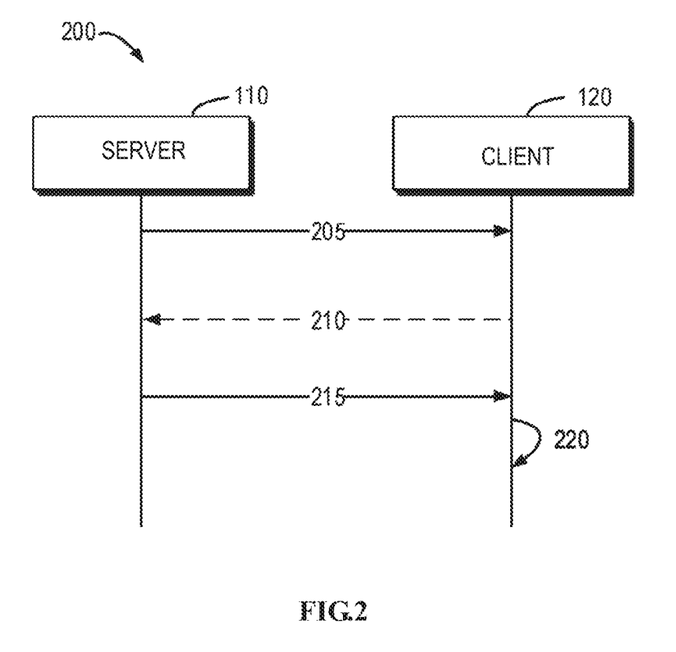
FIG. 2 shows an interaction diagram of a method for data protection according to embodiments of the present disclosure.

Embodiments of the present disclosure will be described below with reference to FIG. 2. Generally, FIG. 2 shows an interaction diagram for a data protection system according to an embodiment of the present disclosure. Typically, this interaction diagram will be described below for server 110 and client 120 of the data protection system 100 shown in FIG. 1. In particular, the corresponding acts of this interaction diagram may also be performed at client 130 and any other suitable component or device.

As shown in FIG. 2, the server 110 for data protection sends 205 a certificate for verifying data validity (referred to as "first certificate") to client 120. After receiving the first certificate, the client 120 may store the first certificate in a module for data protection in client 120 for the subsequent verification of data validity using the first certificate. In case of receiving the first certificate from the server 110, the client 120 may send 210, to server 110, a request information to request the server 110 to send thereto an application installation package for updating, wherein this installation package has been signed with a certificate (referred to as "second certificate"). For example, for a secure and valid installation package, the second certificate may match the first certificate. For an invalid installation package, the second certificate may not match the first certificate. The server 110 sends 215 the installation package to the client 120. After receiving the installation package, the client 120 determines 220 whether the installation package is valid using the received first certificate. In case it is determined that the installation package is valid, the client 120 installs this installation package, in order to complete application update or upgrade for example. In case it is determined that the installation package is invalid, the client 120 may send an alarm to report an error to prevent invalid or tampered installation packages from being installed.

With the interaction process for data protection shown in FIG. 2, the client 120 may receive a certificate for data security protection from the server easily, thereby avoiding importing the certificate manually before system updating. This will improve the data verification efficiency of the data protection system significantly.

Figure 3:
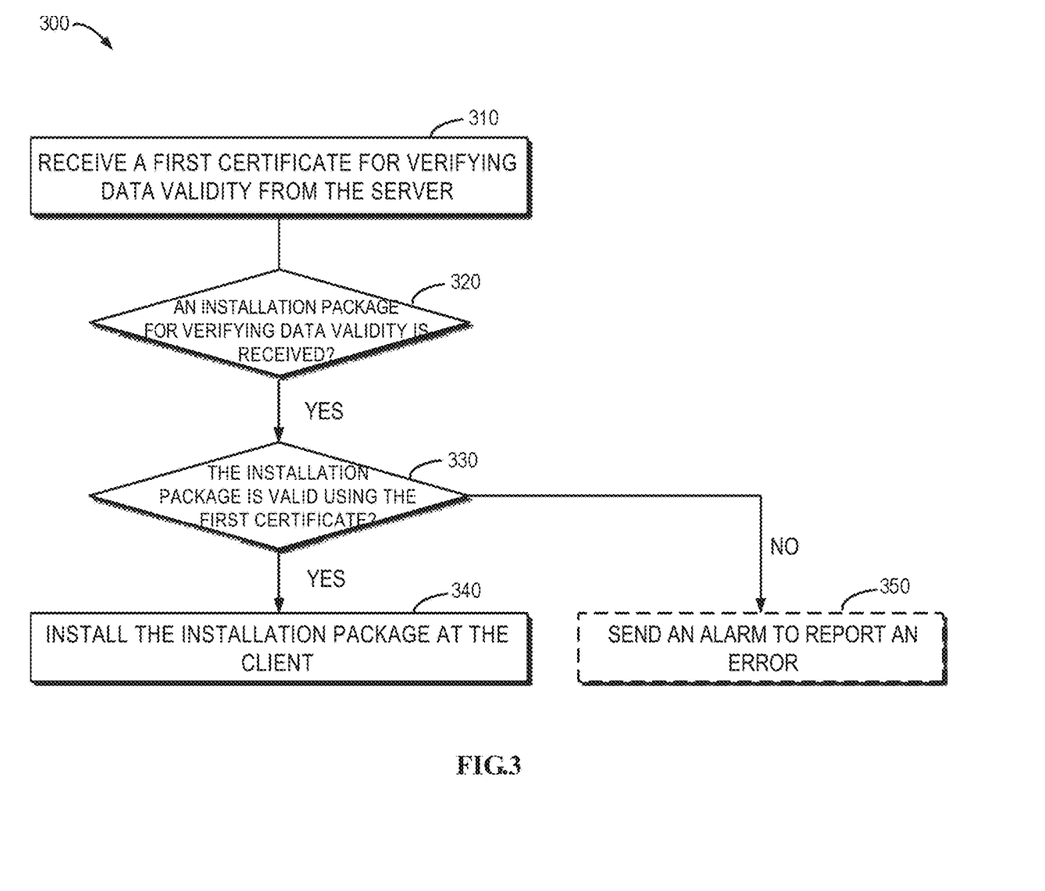
FIG. 3 shows a flowchart of an example method for data protection according to embodiments of the present disclosure.

FIG. 3 is a flowchart illustrating an example method 300 for a data protection system according to an embodiment of the present disclosure. The method 300 may be implemented at the client 120 of the data protection system 100 shown in FIG. 1, and it may also be implemented at client 130 or other parts or devices. The method 300 only implements the example method of the embodiments of the present disclosure. Without losing generality, the method 300 may also include additional acts not shown and/or omit the acts as shown, and the scope of the present disclosure is not limited in this aspect.

At block 310, the client 120 receives a first certificate for data security verification from server 110. By way of example, the first certificate may include a GNU Privacy Guard (GPG) key to verify validity or integrity of the updating of the application or system, thereby achieving the purpose of data protection. In case of receiving the first certificate, the client 120 may install or import the certificate at the client for subsequent data protection.

In some embodiments, in case of receiving the first certificate, the client 120 may send a request to the server 110 for data verification so that the server 110 transmits an installation package for system upgrade or update to the client 120.

At block 320, the client 120 determines whether an installation package to be data verified is received. This installation package is associated with one system update application of the operating system of the client 120. By way of example, the operating system may be a different type of operating system, for example, Windows, Unix or Linux operating system. By way of example, the above installation package may be an RPM installation package, a MSI installation package, a Deb installation package and an EXE installation package.

At block 330, the client 120 determines whether the above received installation package is valid using the first certificate. In some embodiments, the client 120 may extract the second certificate from the installation package described above. Furthermore, the client 120 may compare the above first certificate with the second certificate to determine whether the received installation package meets the requirement of data validity. For example, when the client 120 determines that the second certificate matches the first certificate, it may be determined that the received installation package is valid, while when the client 120 determines that the second certificate does not match the first certificate, it may be considered that the received installation package is invalid.

At block 340, when the client 120 determines that the above installation package is valid, it installs the above received installation package, for instance, to complete application update or upgrade. When the client determines that the above installation package is invalid, at block 350, the client 120 may send an alarm to report an error the server 110.

For the method for data protection shown in FIG. 3, it is possible to accomplish the method with extensible markup language (XML) in an actual system. By way of example, XML data structure may include dependency relation between interactive actions (namely, an execution task for XML) of the server 110 and client 120, and parameter configuration information, such as installation path and installation files and the like. For example, the action dependency relation includes a push action for the first certificate implemented on server 110 and another pushing act for the signed installation package. By defining the dependency relation between the above actions in XML, the server 110 and client 120 may be executed by different execution entities (i.e., the server 110 and client 120) through the action execution flow shown in the above flowchart of FIG. 3.

By way of example, a typical XML data structure may be represented by Table 1 as follows:

TABLE 1

Illustrative Element Description of XML data structure

| Element name | Attribute name | Description |
|---|---|---|
| jobs | N/A | Define the push jobs. |
| job | N/A | Define the job entries. |
| | Name | The job name, it should be unique. |
| | Depends | Job name with the dependency relation, the job corresponding to - job should be performed after job with the dependency relation. |
| files | N/A | Push files at the server. |
| | Dest | Push destination on target client path. |
| file | N/A | Push file entry. |
| | Path | File path at the server of the root path. |
| actions | N/A | Executable actions at the time of start/end. |
| action | N/A | Executable action entry. |
| | Type | Action execution type, it may be "script" which represents a script file that can be executed or "command" which represents a command that can be executed. |
| | At | The action is performed at the time of start/end. |
| | Run | Script file path at the target client at the time of start/end. |

By way of example, after the XML data configuration for example shown in Table 1 is constructed, the XML is sent to the server 110 for data verification. Before the application of the installation package is updated, the server 110 may parse the corresponding configuration in the XML data structure so as to determine the corresponding system configuration and execution logic relation of the action between the server 110 and the client 120 on which application update is to be performed. For example, as shown in Table 1, jobs and –job fields define the job to be executed by the server 110 and the corresponding specific job entries, e.g., the push action for the first certificate and the push action for the installation package as described above, wherein the depends attribute defines the successive dependency relation between two or more actions executed by the server 110. By way of example, the following job execution dependency relation may be defined in the XML data structure, namely, the job that the server 110 sends the installation package is to be performed after it receives the request from the client 120.

It should be understood that the XML data structure described above is merely an exemplary example for implementing a data protection system in the present disclosure. According to actual needs, any other suitable structural language may also be used to implement embodiments of the present disclosure, and the present disclosure is not limited in this aspect.

Figure 4:
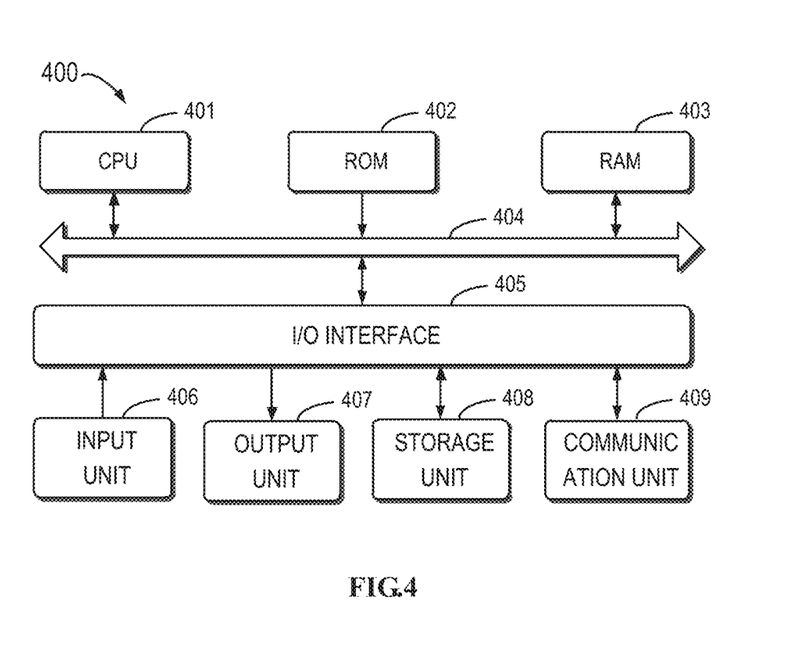
FIG. 4 shows a schematic diagram of an example device that may be used to implement embodiments of the present disclosure.

FIG. 4 is a schematic diagram illustrating an example device 400 that may be used to implement embodiments of the present disclosure. For example, clients 120 and 130 shown in FIG. 1 may be implemented by the device 400. As illustrated, the device 400 includes a central processing unit (CPU) 401 which can perform various appropriate acts and processes based on the computer program instructions stored in a read-only memory (ROM) 402 or the computer program instructions loaded into a random access memory (RAM) 403 from a storage unit 408. In the RAM 403, various programs and data required for the operation of the device 400 can also be stored. CPU 401, ROM 402 and RAM 403 are connected to each other through a bus 404. Input/output interface 405 is also connected to the bus 404. The CPU 401, the ROM 402, and the RAM 403 are connected to one another via a bus 404.

A plurality of components in the device 400 are connected to the I/O interface 405, comprising: an input unit 406, such as a keyboard, a mouse and the like; an output unit 407, such as various types of displays, loudspeakers and the like; a storage unit 408, such as the magnetic disk, optical disk and the like; and a communication unit 409, such as network card, modem, wireless communication transceiver and the like. The communication unit 409 allows the device 400 to exchange information/data with other devices through computer networks such as Internet and/or various telecommunication networks.

Each procedure and processes described above, such as method 300 shown in the schematic diagram FIG. 3, may be performed by a processing unit 401. For example, in some embodiments, the method 300 may be implemented as computer software programs, which are tangibly included in a machine-readable medium, such as storage unit 408. In some embodiments, some or all of the computer program can be partially or completely loaded and/or installed to the device 400 via ROM 402 and/or the communication unit 409. When the computer program is loaded to RAM 403 and executed by CPU 401, one or more steps of the above described method 300 are implemented.

The present disclosure may be a method, an apparatus, a system and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction-executing device. The computer-readable storage medium may be, but not limited to, electrical storage devices, magnetic storage devices, optical storage devices, electromagnetic storage devices, semiconductor storage devices or any random appropriate combinations thereof.

More specific examples (non-exhaustive list) of the computer-readable storage medium comprise: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here may be downloaded from the computer-readable storage medium to various computing/processing devices, or to external computers or external storage devices through Internet, such as local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure can be assembly instructions, instructions of instruction set architecture (ISA), machine instructions, machine-related instructions, microcode, firmware instructions, state setting data, or a source code or target code written in any combinations of one or more programming languages comprising object-oriented programming languages, such as Smalltalk, C++ and so on, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer or connected to an external computer (such as via Internet provided by the Internet service provider) through any type of networks, including local area network (LAN) or wide area network (WAN). In some embodiments, the electronic circuit is customized by using the state information of the computer-readable program instructions e.g. a programmable logic circuit, a field programmable gate array (FPGA) or a programmable logic array (PLA), this electronic circuit may execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions cause the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The flow chart and block diagram in the accompanying drawings present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flowchart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text are intended to best explain principle, actual application or technical improvement in the market of each embodiment or make each embodiment disclosed in the text comprehensible for those ordinary skilled in the art.

What is claimed is:
1. A method for data protection, comprising:
  receiving, from a server, a first certificate for verifying data validity, wherein the first certificate comprises a GNU Privacy Guard (GPG) key;
  in response to receiving, from the server, an installation package to be verified for data validity, determining whether the installation package is valid using the first certificate, the installation package being associated with one system update application of an operating system of a client; and in response to determining that the installation package is valid, installing the installation package at the client, wherein determining whether the installation package is valid using the first certificate comprises:
extracting a second certificate from the installation package;
in response to determining that the second certificate matches the first certificate, determining that the installation package is valid; and
in response to determining that the second certificate does not match the first certificate, determining that the installation package is invalid.

2. The method according to claim 1, further comprising:
in response to determining that the installation package is invalid, sending an alarm to report an error.

3. The method according to claim 1, further comprising:
in response to receiving the first certificate, sending a request to the server such that the server sends the installation package to the client.

4. The method according to claim 1, wherein the installation package is at least one of the following:
an RRM installation package,
a MSI installation package,
a Deb installation package, and
an EXE installation package.

5. A device for data protection, comprising:
at least one processing unit;
at least one memory coupled to the at least one processing unit and storing instructions executed by the at least one processing unit, the instructions, when executed by the at least one processing unit, causing the device to perform a method, the method comprising:
receiving, from a server, a first certificate for verifying data validity, wherein the first certificate comprises a GPG key;
in response to receiving, from the server, an installation package to be verified for data validity, determining whether the installation package is valid using the first certificate, the installation package being associated with one system update application of an operating system of a client; and
in response to determining that the installation package is valid, installing the installation package at the client,
wherein determining whether the installation package is valid using the first certificate comprises:
extracting a second certificate from the installation package;
in response to determining that the second certificate matches the first certificate, determining that the installation package is valid; and
in response to determining that the second certificate does not match the first certificate, determining that the installation package is invalid.

6. The device according to claim 5, wherein the method further comprises:
in response to determining that the installation package is invalid, sending an alarm to report an error.

7. The device according to claim 5, wherein the acts further comprise:
in response to receiving the first certificate, sending a request to the server such that the server sends the installation package to the client.

8. The device according to claim 5, wherein the installation package is at least one of the following:
an RRM installation package,
a MSI installation package,
a Deb installation package, and
an EXE installation package.

9. A computer program product tangibly stored on a non-transient computer storage medium and comprising machine executable instructions, the machine executable instructions, when executed by a device, causing the device to execute method, the method comprising:
receiving, from a server, a first certificate for verifying data validity, wherein the first certificate comprises a GPG key;
in response to receiving, from the server, an installation package to be verified for data validity, determining whether the installation package is valid using the first certificate, the installation package being associated with one system update application of an operating system of a client; and
in response to determining that the installation package is valid, installing the installation package at the client,
wherein determining whether the installation package is valid using the first certificate comprises:
extracting a second certificate from the installation package;
in response to determining that the second certificate matches the first certificate, determining that the installation package is valid; and
in response to determining that the second certificate does not match the first certificate, determining that the installation package is invalid.

10. The computer program product according to claim 9, wherein the method further comprises:
in response to determining that the installation package is invalid, sending an alarm to report an error.

11. The computer program product according to claim 9, wherein the method further comprises:
in response to receiving the first certificate, sending a request to the server such that the server sends the installation package to the client.

12. The computer program product according to claim 9, wherein the installation package is at least one of the following:
an RRM installation package,
a MSI installation package,
a Deb installation package, and
an EXE installation package.

* * * * *